United States Patent
Colbert et al.

(10) Patent No.: US 8,245,081 B2
(45) Date of Patent: Aug. 14, 2012

(54) ERROR REPORTING THROUGH OBSERVATION CORRELATION

(75) Inventors: Osten Kit Colbert, San Francisco, CA (US); Dilpreet Bindra, Union City, CA (US); Patrick Tullmann, Millbrae, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 12/703,578

(22) Filed: Feb. 10, 2010

(65) Prior Publication Data

US 2011/0197090 A1 Aug. 11, 2011

(51) Int. Cl.
*G06F 11/00* (2006.01)

(52) U.S. Cl. ...................................................... 714/38.1

(58) Field of Classification Search ............ 714/38.1–13
See application file for complete search history.

(56) References Cited

U.S. PATENT DOCUMENTS

| | | | | |
|---|---|---|---|---|
| 5,953,530 A * | 9/1999 | Rishi et al. | ..................... | 717/127 |
| 5,974,568 A * | 10/1999 | McQueen | ........................ | 714/38 |
| 7,010,781 B1 * | 3/2006 | Brown et al. | ................. | 717/124 |
| 7,120,901 B2 * | 10/2006 | Ferri et al. | ..................... | 717/128 |
| 7,188,279 B2 * | 3/2007 | Iizuka | ............................. | 714/38 |
| 7,293,191 B1 * | 11/2007 | Arumugham et al. | ........ | 714/5.11 |
| 7,363,550 B2 * | 4/2008 | Pierce et al. | .................... | 714/57 |
| 7,594,141 B2 * | 9/2009 | Kalavacharla et al. | ......... | 714/38 |
| 7,810,075 B2 * | 10/2010 | Dostert et al. | ................ | 717/128 |
| 2003/0037291 A1 * | 2/2003 | Goldsmith et al. | ............ | 714/38 |
| 2003/0204804 A1 * | 10/2003 | Petri et al. | ...................... | 714/746 |
| 2005/0028145 A1 * | 2/2005 | Kang et al. | ..................... | 717/128 |
| 2005/0273667 A1 * | 12/2005 | Shrivastava et al. | ........... | 714/38 |
| 2006/0143515 A1 * | 6/2006 | Kuramkote et al. | ........... | 714/15 |
| 2008/0072213 A1 * | 3/2008 | Elliott et al. | ................... | 717/128 |
| 2008/0235536 A1 * | 9/2008 | Benedek et al. | ................ | 714/38 |
| 2008/0244337 A1 * | 10/2008 | Breiter et al. | ................. | 714/699 |
| 2008/0307266 A1 * | 12/2008 | Chandrasekaran | ............. | 714/38 |
| 2009/0049428 A1 * | 2/2009 | Cozmei | ......................... | 717/128 |
| 2009/0210745 A1 * | 8/2009 | Becker et al. | ................... | 714/26 |
| 2010/0064179 A1 * | 3/2010 | Champlin et al. | ............. | 714/38 |
| 2010/0100774 A1 * | 4/2010 | Ding et al. | ..................... | 714/45 |
| 2010/0218031 A1 * | 8/2010 | Agarwal et al. | ................. | 714/2 |
| 2010/0251002 A1 * | 9/2010 | Sivasubramanian et al. | ..... | 714/2 |
| 2010/0313073 A1 * | 12/2010 | Leeb et al. | ...................... | 714/37 |

\* cited by examiner

*Primary Examiner* — Scott Baderman
*Assistant Examiner* — Neil Miles (57) ABSTRACT

A software component is executed to carry out a task, the task including a subtask. An external function is called to perform the subtask, the external function executing in a separate thread or process. The component receives an observation recorded by the external function, the observation including an identifier of a possible error condition and instance data associated with the possible error condition. The possible error condition being a cause of the failure of the external function to carry out the subtask. If the task cannot be completed, then a new observation is recorded along with the received observation, the new observation being related to a possible error condition of the component, which is a cause of the failure of the component to carry out the task. When the task can be completed despite the failure of the external function, the observation recorded by the external function is cleared.

23 Claims, 6 Drawing Sheets

ErrorInstance DataReason

| Process id: 20 | | | |
|---|---|---|---|
| Observation Name | Error | ErrorInstance | DataReason |
| xxxx | Page out failed | Page 30 | File system error |
| yyyy | Write failed | Byte 4000 of file 'foo', length 4000 | Driver failed |
| zzzz | Driver write failed | Sector 12, offset 40, length 4000 | Failed to get disk lock |

Fig. 7

ERROR REPORTING THROUGH OBSERVATION CORRELATION

BACKGROUND

Many complex applications in use today rely on multiple software components communicating with one another to provide desired functionality. Tasks being carried out by a computer program may be divided and distributed among multiple software components. For example, multiple processes running on a single computer or multiple computers in electronic communication with each other may each carry out a portion of a task. For example, multiple programs (or processes) on multiple computer systems working cooperatively to carry out a task are provided in classic multi-tiered web application architecture. Each process may include a plurality of threads, each thread being a stream of instructions being executed by a computer processor. A process can have one or more threads executing in a common virtual address space. Each thread may have multiple subcomponents, such as executable objects (in object-oriented programming), subroutines, functions, etc.

Each component, which may be a separate program, a thread, a library or application programming interface (API), executable object, subroutine, or function, etc., is typically called by a calling component to perform some task, and itself (the called component) may rely on additional called components to perform certain subtasks. For example, an application may need to read a configuration file, and call a "file-read" component for opening and reading file contents of the configuration file into a data buffer. The file-read component, in turn, may call another process, e.g., via an API provided by the operating system (OS), to open the file. If the file does not exist, the file-open component of the OS may return an error code to the "file-read" component, which may then return a corresponding error code to the parent application component. In some cases, this chain of call commands, or "call-stack," can be very long, spanning multiple threads and even, through remote procedure calls (RPCs), web service requests, etc., multiple computer systems. Identifying the root causes of errors in these long call-stacks can be very tricky for users such as developers, system administrators, and end users.

The poor quality of error logs and messages is a persistent problem for users, especially in the case of large or distributed programs having multiple parts distributed across multiple processes in a single system or across a network of physical or virtual computer systems. Typical error reporting in such systems may be vague or misleading, only describing a small part of the error phenomenon observed. In general, error messages fail to identify or make apparent the root cause of the problem and do not provide any remediation steps.

One common cause for poor error reporting may be referred to as translation loss, which occurs as an error is repeated up the call stack. For example, suppose a first component calls a second component that calls a third component. The third component returns an error code to the second component indicating a specific problem that arose, preventing it from completing its task. The second component receives the error code of the third component, and due to the failure of the third component, cannot complete its own task and therefore returns an error message to the first component, perhaps indicating a failure of the second component but not retaining the specific problem provided by the error code of the third component. Therefore, the specific failure known at the lower levels of the chain of components is lost as the return codes are translated and passed up the chain. At the highest levels of the chain, the error message may be so general as to provide no useful or actionable information.

Another common cause is lack (or loss) of instance information. Instance information is the specific data or parameters being passed to the component or accessed by the component when the error occurred. The instance information can also include context or state information of the component at the time the error occurred. For example, if the error was a connection failure, then instance data may include what entities were being connected and network parameters used in the connection attempt. Typical error reporting schemes do not retain such instance data, which would generally be very helpful in tracking down and correcting errors.

Another problem is the lack of a global view of the error: even if the user knew what caused the error in terms of the component that first observed the error and all the instance data surrounding it, this information may still not be useful without also knowing, for example, why that component was called in the first place, i.e., what the higher level components were and what they knew. That is, knowing that particular port failed may not be helpful without also knowing why the port was attempted to be opened in the first place or to whom it belonged. The higher-level components may have this information, but correlating the higher level information with the lower-level information has not been possible, particularly when the higher level information is held by different threads running on possibly different physical computer systems.

Another problem is the over-reporting of errors. For example, a result may be an "error" at one layer of the system but may not be an error at another layer. For instance, the filesystem of a kernel failing to find a file during an "open" call would be considered an error for the "file-open" function, but if the userlevel application expects the open to fail in some cases, such as for an optional configuration file, then the open failure is not considered an error by the userlevel application. This makes planning for and potentially enumerating all errors messages up front very difficult because the structure of the software code will greatly affect where in the code error messages should be generated.

A number of methods of creating and managing error messages are known, some of which attempt to overcome the aforementioned difficulties. The first (in no particular order) and most basic method of producing error messages is to create a static mapping between error code and error message. This is done in Unix environments through the "errno" variable, which contains the latest error code returned from a system call. The errno can then be converted by a mapping to a text string, which can be displayed to the user. Windows has a similar mechanism of standard error code to text string conversion. However, the set of error codes is typically small such that there are no specifics about the particular error given. Instead, just a general category of the error is provided.

The second error reporting scheme involves maintaining a central authority of error message (and even error code) creation. In this scenario, a single "error code book" is kept that maps each error code to a detailed description and remediation steps. However, unless extensive efforts are undertaken, this method often results in errors that are too generic to be useful in addition to the high overhead of maintenance.

Third, attempts have been made to link a software crash to a knowledge base (KB) article through the use of the symbolic backtrace of the crash. The symbolic backtrace includes function addresses and arguments stored on the stack. However, this approach is only useful if a crash occurs, and then only if there is already a KB mapping in place. Without the KB, it is very difficult for the average user to glean information from the symbolic backtrace. There is no easily accessible instance information included in the symbolic backtrace. This means that the KB has to be somewhat generic. Also, symbolic backtraces for the same root cause may slightly differ (e.g. may have an extra function or two in them), meaning that a given backtrace may not be matched successfully to a KB that describes its root cause even if such a KB exists. Symbolic backtraces are also easily obsolesced, e.g., when a new version of a particular application or subcomponent (such as a dynamically linked library) is released.

Fourth, some companies build applications that analyze log output from an application and try to do correlation and derive information from those logs. Two examples of these are Splunk™ and EMC's Smarts™. Splunk™ has a generic framework for analyzing text log output and specific plug-ins for various software applications. It uses regular expressions and a rule engine to understand the text log output and add that data into its framework and cross-reference it, at which point the user can search for information in it. Smarts™ polls error paths to try and track errors back to their root cause. In general, these applications are built to compensate for deficiencies in the observed application. In addition, there are commonly lots of application-specific error conditions that the developers of that application know about but do not make external in any way, thus limiting the ability of these tools.

Fifth, in some approaches human readable error messages are collected on a stack of messages that are eventually given to the user or cleared if a function handles the error. The set of error messages are displayed to the user who must determine the root cause from the set of messages displayed.

Faced with the limitations of current approaches, users typically rely on a number of external factors. They may contact the technical support of the application provider, possibly incurring additional cost to the provider. User group sites are set up on the Internet to share ad-hoc solutions to common problems. Intra-company best practices are set up in advance to try and predict the possible problems so that there are ready solutions. In short, software users spend an inordinate amount of time and effort to compensate for the low quality of error messages in software applications today.

SUMMARY

A mechanism to correlate related observations of possible error conditions is described herein. In general, a software component is executed to carry out a task, the task including a subtask. An external function is called to perform the subtask, the external function executing in a separate thread or a separate process. The component receives an observation recorded by the external function, the observation including an identifier of a possible error condition and instance data associated with the possible error condition. The possible error condition being a cause of the failure of the external function to carry out the subtask. If the task cannot be completed, then a new observation is recorded along with the received observation, the new observation being related to a possible error condition of the component, which is a cause of the failure of the component to carry out the task. When the task can be completed despite the failure of the external function, the observation recorded by the external function is cleared.

BRIEF DESCRIPTION OF THE DRAWINGS

Various embodiments of the invention are disclosed in the following detailed description and the accompanying drawings.

DETAILED DESCRIPTION

Figure 1:
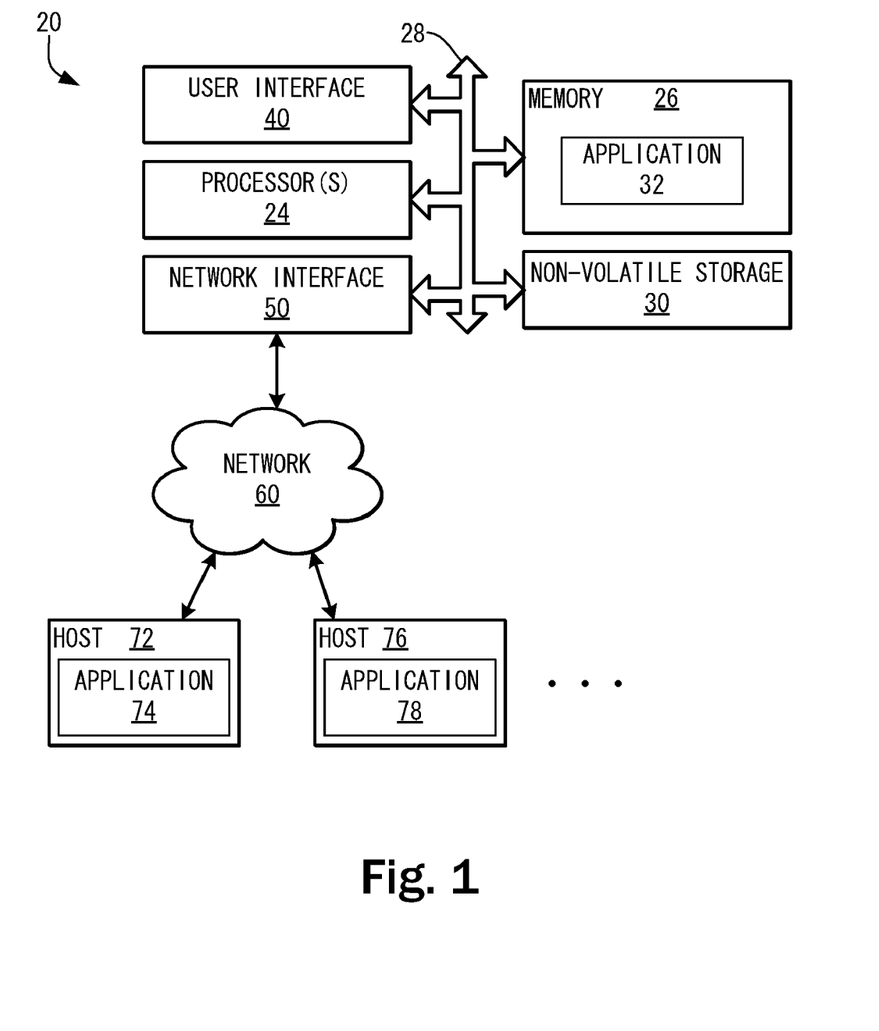
FIG. 1 shows a computer system.

FIG. 1 shows a computer system 20 having one or more processors 24, memory system 26, non-volatile storage 30, and a network interface 50, all connected by one or more data busses 28. In addition, a user interface 40 may be provided and connected to data bus 28, including mouse, keyboard inputs, and a display output (not shown). Non-volatile memory 30 may include a magnetic or solid-state media embodying computer program instructions and/or data inputs and/or outputs which may be selectively loaded into memory 26 as generally understood in the art. Memory 26 includes application 32, which may include a plurality of components (not shown). Each component may be an executable entity such as a thread or process that runs in its own virtual memory space, and each component in turn may have subcomponents such as software components, including, by way of example, executable objects, subroutines, functions, etc. that run in the common virtual address space of the initial component. Such software subcomponents, and the mechanisms to call one component or subcomponent from another are well known in the field of computer science.

Application 32 may communicate with other applications (not shown) running on computer 20 and/or over network 60 with applications 74, 78 running on respective external hosts 72, 76, etc. Such communication may be in the form of a remote procedure call (RPC), or other application programming interfaces (API) that allows application 32 to cause applications or components on computer 20 or hosts 72, 76, etc., to perform desired function on behalf of application 32. Each called application that runs externally to application 32 may in turn rely on other called components, either internally within a single thread or to additional programs running as separate processes in separate virtual memory address spaces.

Each component is generally designed to perform a specific function, and as such may be called from multiple other components such that the component may be reused to perform the desired function on behalf of multiple other components. In many cases, the component may be unpredictably unable to perform its function or generate unpredictable results. In this case, the calling component may require some return value that indicates the success, failure, or other condition information useful to the calling component in carrying out its own function. For example, a component designed to calculate a third internal angle of a triangle when given the other two may fail if the sum of the two given angles equals or exceeds 180 degrees (or $\pi$ radians), or if one of the angles given is not a positive number. It may be useful to the calling component to know that an error occurred and which of the two (or both) possible error conditions led to the inability of the component to complete its task.

In some cases, a component may be able to resolve an error it encounters, either directly or indirectly, e.g., when receiving an error code from a called component. For example, a component attempting to send a message to a particular endpoint may receive an error code from a called message-sending component configured to contact endpoints, the error code indicating that the endpoint is not reachable over the selected network. The initial component may be configured, upon receiving this error, to try again over a different network or using different networking parameters. If the second attempt succeeds, then the encountered error was resolved by the component seeking to send the message, since the particular component designed to send the message succeeded in doing so. In some cases, a calling component may receive an error code from a called component, but the calling component may not consider the error code an actual error of the system. For example, suppose a particular component is designed to determine whether a particular file exists. To do so, it may attempt an open operation of the file, and call an open file component. If the file does not exist, the open file component will return an error indicating that the file does not exist. This may not be considered an error to the calling component, however, since the calling component has fulfilled its function in determining whether the file exists. Thus, errors may be resolved by remediating the error, or by determining that the potential error is not an error. In this manner, errors or other conditions may be resolved by components, in which case a record or log of the error or condition is generally not needed.

Figure 2:
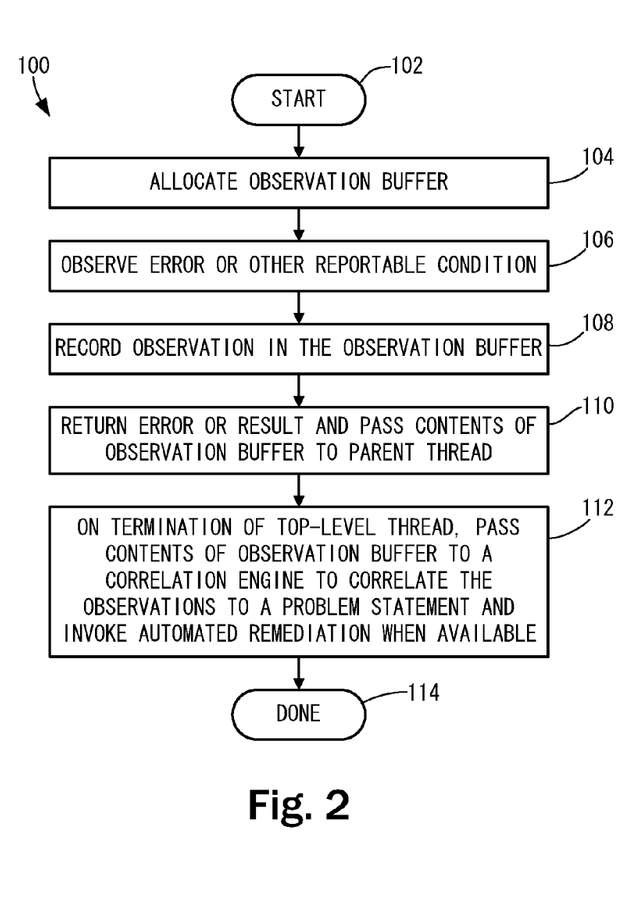
FIG. 2 shows a flow diagram illustrating an embodiment of a process for handling an error or other reportable observation.

FIG. 2 is a flow diagram 100 illustrating an embodiment of a process for handling an error or other reportable observation. In the example shown, a software component is configured to record observations in the event of an error or other condition that the component cannot resolve, and pass the observation to a calling component. The procedure begins as indicated by start block 102 and flows to operation 104, wherein an observation buffer is allocated in the system memory. In one embodiment, every time a thread is created, an observation buffer is created along with that thread and assigned to it. The observation buffer may simply be an addressable memory space in the main memory 26 shown in FIG. 1 of the system, but could also be implemented as a file on a disk or other non-volatile memory system, e.g., non-volatile storage 30, also shown in FIG. 1.

In operation 106, an error or other reportable condition is observed by the component. The condition may be, for example, an indication of a hardware condition, such as a bad disk sector, or a missing or inaccessible device, or an indication of unusable or improper input data. Additionally, the observation may consist of receipt of a return value from another component, wherein the return value indicates an error condition by that called component.

It should be noted that the condition being observed may not be an error per se. For example, the condition may be an indication of an expected or proper operation of the software program, despite the fact that the condition prevents the component for completing the function that the component is designed to perform. In this case, the component may not "know" whether a particular observation represents an error in the system. After identifying the observed condition, which is generally a potential error, the procedure flows to operation 108.

In operation 108, the condition observed in operation 106 is recorded to the observation buffer allocated in operation 104. In one embodiment, the observation recording operation is performed by calling a function that is configured for recording observations on behalf of calling functions. If another function subsequently handles the error and clears the buffer, it will only affect the observations for the current thread. A component encountering an error that cannot be resolved by that component may be configured to call the observation recording function, and to pass to such function one or more arguments comprising the error type and instance data observed by the code at the site of the error. The observation recording function then adds this data to the observation buffer on behalf of the code that observed the error. Operations 106 and 108 may be repeated for each error encountered by the thread or component thereof.

In one embodiment, each observation that is recorded includes an observation identifier and instance data. In one example implementation, observation identifiers are immutable. That is, once an observation identifier is used for a specific observation, it cannot be reused (i.e. if the observation changes meaning, a new identifier must be chosen). The observation identifier may simply be an integer value. Each identifier may be separately defined in a database or table, along with associated data fields for the accompanying instance data.

In operation 110, the thread returns an error or other result to the parent thread that spawned the thread, and passes the contents of the observation buffer allocated in operation 104 and added to in operation 108 to the parent thread. The thread may then exit if it has no more tasks, depending on requirements and implementation. The parent thread may add the received observations to its own observation buffer, and pass them up to the grandparent thread that spawned the parent thread, and so on. In one embodiment, each time a thread exits or completes (or is unable to complete) its task, it passes any observations accumulated in its observation buffer to its parent thread. The mechanism for managing observation buffers for various threads is therefore incorporated into a thread management framework. Within each thread's execution, there may be multiple calls to internal functions or subroutines that execute as part of the thread, the functions or subroutines potentially contributing to the thread's observation buffer if they are unable to complete their task, as described above. In one embodiment, code for managing the observation buffer is contained in a function such as "RECORD_OBSERVATION" which is callable from any component (e.g., function) making an observation. The observation buffer management code may be built into the thread infrastructure or may be explicitly maintained at thread control transfers. That is, observations need to be managed when returning values to the thread invoker, which might be different from when the thread exits. In one embodiment, calls from the user mode applications into the kernel may be annotated such that observations recorded in the kernel can be returned to the user mode application when the call returns. In this manner, kernel programmers need only call "RECORD_OBSERVATION" and not worry about ensuring the observations are properly passed back to the user level applications.

If there is no parent thread, then the accumulated observations may be displayed for a user or transferred to a correlation engine as generally described with reference to operation 112. Of course, depending on the application design requirements, at any point in execution, the software may be configured to display the error to a user, or perform some additional error logging function in the manner generally known in the art.

At some point, it is possible that an error cannot be resolved by the program, or top-level component, in which case the program may terminate with unresolved errors. At this point, the observation buffer of the top-level thread or component may include a plurality of accumulated observations. In one embodiment, the contents of the observation buffer are passed in operation 112 to a correlation engine configured to map a set of observations to a problem statement. In various embodiments, the problem statement may include a human readable message or other human readable explanation of the error, its underlying cause, its severity, and/or actions required to remediate the problem. In some embodiments, the system may be configured to auto-remediate based on information comprising a problem statement to which a set of observations has been mapped by such a correlation engine. After passing the observation buffer contents to the correlation engine, the procedure may terminate, as indicated by done block 114.

It should be noted that, while in the description above one observation buffer is assigned to each thread, this is not a requirement so long as the contextual history of an error is implicitly captured. Provided that the series of observations, originating from the first, low-level one to the final, high-level one are captured any specific mechanism may be implemented. In the example described above with reference to FIG. 2, thread execution is relied upon to string together a number of different functions spanning (at least a portion of) the call stack. But there are other ways to do this. For instance, error propagation may be tracked across process boundaries. In that case, RPC messages may be monitored and tracked, essentially stringing together the threads from each process for a true end-to-end history. In another example, SCSI (small computing system interface) tokens may be enhanced with an observation buffer. In this case, each SCSI token represents an outstanding I/O request. The tokens are passed around between threads, functions, processors, etc. in the normal course of servicing the request. In this embodiment, an observation buffer may be included within each SCSI token and have the functions update the buffer on the token rather than on the thread when they encounter an error. This way, whichever application made the I/O request will eventually come back to check on it, and if there was an error, that application would receive the token back and could access the observation buffer from the token (and possibly copy the token's buffer to its thread observation buffer, again linking up the history).

In yet another embodiment, each time a "new" error is encountered, a new observation buffer is created. Multiple observation buffers (for multiple concurrent unrelated possible error conditions) would be possible in a single thread, and may be maintained across multiple threads multiple processes. Rather than, or in addition to, returning an error code to a parent component when a function encounters an error, an index into the correct observation buffer can be provided. Rather than clearing the observation buffer when an error is resolved, the observation buffer is deleted or reallocated.

Figure 3:
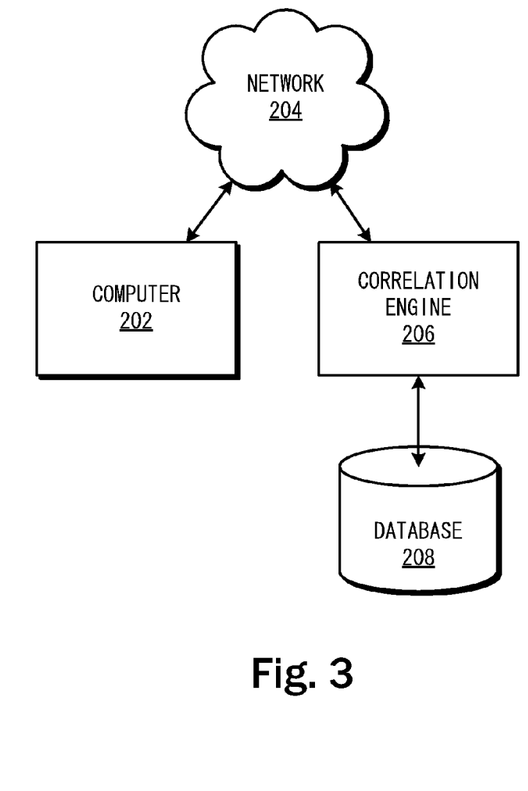
FIG. 3 is a block diagram illustrating an embodiment of a system for handling software errors.

FIG. 3 is a block diagram illustrating an embodiment of a system for handling software errors. In the example shown, a computer 202 is running software that is configured, e.g., as described above with reference to FIG. 1. Computer 202 comprises one or more observation buffers, for example a per thread buffer for each active thread, as described above, into which the observations are recorded. Computer 202 may be configured to communicate the set of observations via a network 204 to a correlation engine 206. Network 204 may, for example, include an Internet connection and correlation engine 206 may reside on a server maintained by a vender or publisher of the software running on computer 202, or other authority responsible for maintaining the software. While in the example shown correlation engine 206 is remote (across network 204) from computer 202, in other embodiments the two systems may be collocated, directly connected, and/or included in the same system.

Correlation engine 206 may be configured to attempt to map a received set of observations to a problem statement residing in a problem statement store 208. In some embodiments, correlation engine 206 computes a confidence score for each of one or more problem statements, if found, determined to be a potential match, and a most likely one or more of the potential matches is returned. In some embodiments, an administrator or other human operator evaluates the returned problem statement, in light of the set of observations and/or other information, to determine if the match is valid and/or to take responsive action recommended by or otherwise associated with the problem statement. In some embodiments, if no match is found, a new problem statement may be defined and associated with the received set of observations. For example, an administrator or other user may be alerted to the fact that no problem statement matching a received set of observations was found, and the user may be provided an interface to define a new problem statement for that set of observations, so that the new problem statement will be available if the same or a similar error is encountered in the future.

Figure 4:
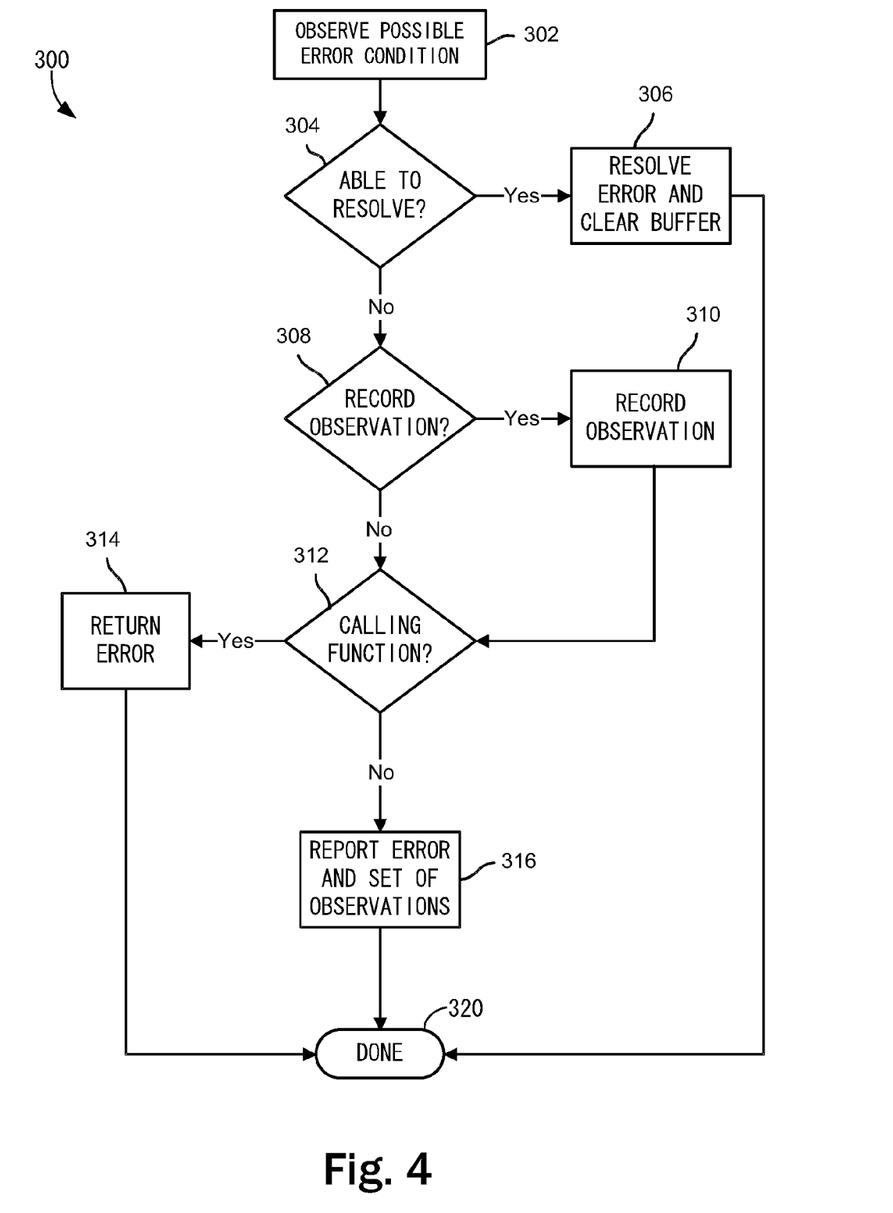
FIG. 4 shows flow diagram illustrating an embodiment of a process for handling an error.

FIG. 4 shows flow diagram 300 illustrating an embodiment of a process for handling an error. In the example shown, a component observes a possible error condition in operation 302. The observed condition may be, for example, an error returned by a called function or a different thread or process that was called by the current component, or an error directly identified by the current component. In operation 304, it is determined whether the component can resolve the condition. As mentioned above, a possible error condition is resolved when it is can be determined by the component that the observed condition was not actually an error, or by programmatically overcoming or avoiding the observed possible error condition. If the possible error condition can be resolved, then the procedure flows to operation 306, otherwise, the procedure flows to operation 308.

In operation 306, if the calling function can resolve the error, either by taking responsive action or by identifying the condition as not actually being an error, then the component resolves the error and clears the observation buffer. The procedure then ends as indicated by done block 320. If the possible error condition cannot be resolved, then it is determined whether the current observation should be recorded in operation 308. In some circumstances, a particular observation may not be recorded at the discretion of the programmer or designer, e.g., if the component is simply passing to a calling component an error code received from a called component, and has no useful information to add regarding it. In this case, the procedure flows to directly to operation 312; otherwise, the procedure flows to operation 310 wherein the component records its observation in an associated observation buffer and the procedure then flows to operation 312.

In operation 312, it is determined whether the present component was called by a calling component, in which case the procedure flows to operation 314 wherein the component returns an error code as a return value to the to the calling component. If the calling component is another program, e.g., running as a separate process or thread or on another computer, the present component may transmit the contents of the observation buffer to the calling component via an interprocess message over the available communication path. For example, the component may pass the observation buffer's contents to the calling component over a network connection, through shared memory, or any other communication mechanism, depending on how the present component and calling components are configured.

If the current component was not called by a calling component, i.e., it is a top-level component or thread that was, e.g., initiated by a user, then the procedure flows to operation 316 wherein the component reports the error and the associated set of observations.

In some embodiments, the set of observations reported in operation 316 is reported to a correlation engine, as described above with reference to FIGS. 2 and 3 (not shown in FIG. 4). After returning the error in operation 314, or reporting the error and set of observations in operation 316, the procedure ends as indicated by done block 320.

Figure 5:
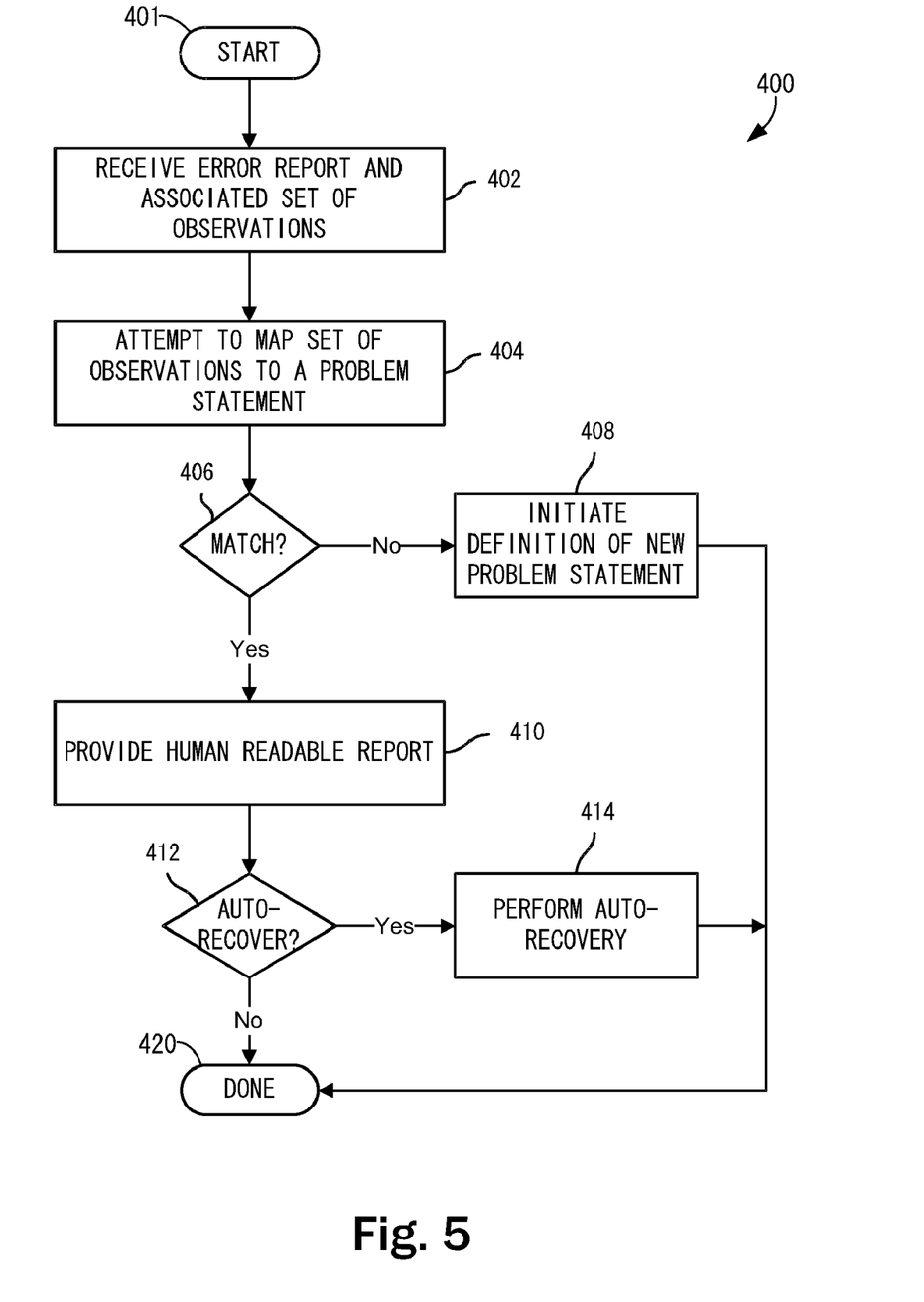
FIG. 5 shows flow diagram illustrating by way of example a process for processing a set of observations.

FIG. 5 shows flow diagram 400 illustrating by way of example a process for processing a set of observations. In one embodiment, the process of FIG. 5 may be implemented by a correlation engine such as correlation engine 206 described above with reference to FIG. 3. The procedure begins as indicated by start block 401 and flows to operation 402 wherein an error report and associated set of observations is received, e.g., from an exiting program. The procedure then flows to operation 404, wherein an attempt is made to map the set of observations to a problem statement. The mapping may be identified using a database 206 such as that shown in FIG. 3. In one embodiment, the mapping attempt can be performed by comparing the set of observations with sets of observations contained in the database. If the database contains a matching set of observations, then a mapping is achieved. However, if the database does not contain a matching set of observations, then mapping may still be achieved if, for example, all the database contains a record with identical errors but differing instance data, or one or more similar records. A similar record may be a record having most of the same errors as reported in the observation set. If the database contains more than one identical record, or a plurality of similar records, then the identical and/or similar records may be considered to be "matching" records and presented to the user as described below in operation 410

In operation 406, it is determined whether one or more entries exist in database 206 that match the set of observations received in operation 402. If a match is not found, then the procedure flows to operation 408, wherein a definition of a new problem statement may be initiated, and the procedure ends as indicated by done block 420. A new problem statement may be initiated by analyzing the set of observations to determine the root cause of the error. Because of the robust error reporting mechanism herein described, such an analysis will generally be rather straight-forward. The user or administrator etc. can then create a new record for the database so that if the same set of observations are created again, a matching record will be available to quickly identify the root cause of the error.

If a match is found in operation 406, then the procedure flows to operation 410 wherein a human readable report may be generated listing each of the matches. A confidence value for each match may be calculated and provided to the user, the confidence value being based on the percentage of identical errors in the database record as compared with the observation set. The human readable report may be augmented with instance data pulled from the observation stack to provide the user with specific actionable information that can be used to resolve the error. Then, in operation 412, it is determined whether auto-recovery procedure is possible, and if so the procedure flows to operation 414, and if the problem statement provides a basis for auto-recovery (i.e., remediation), then auto-recovery is performed in operation 414.

Figure 6:
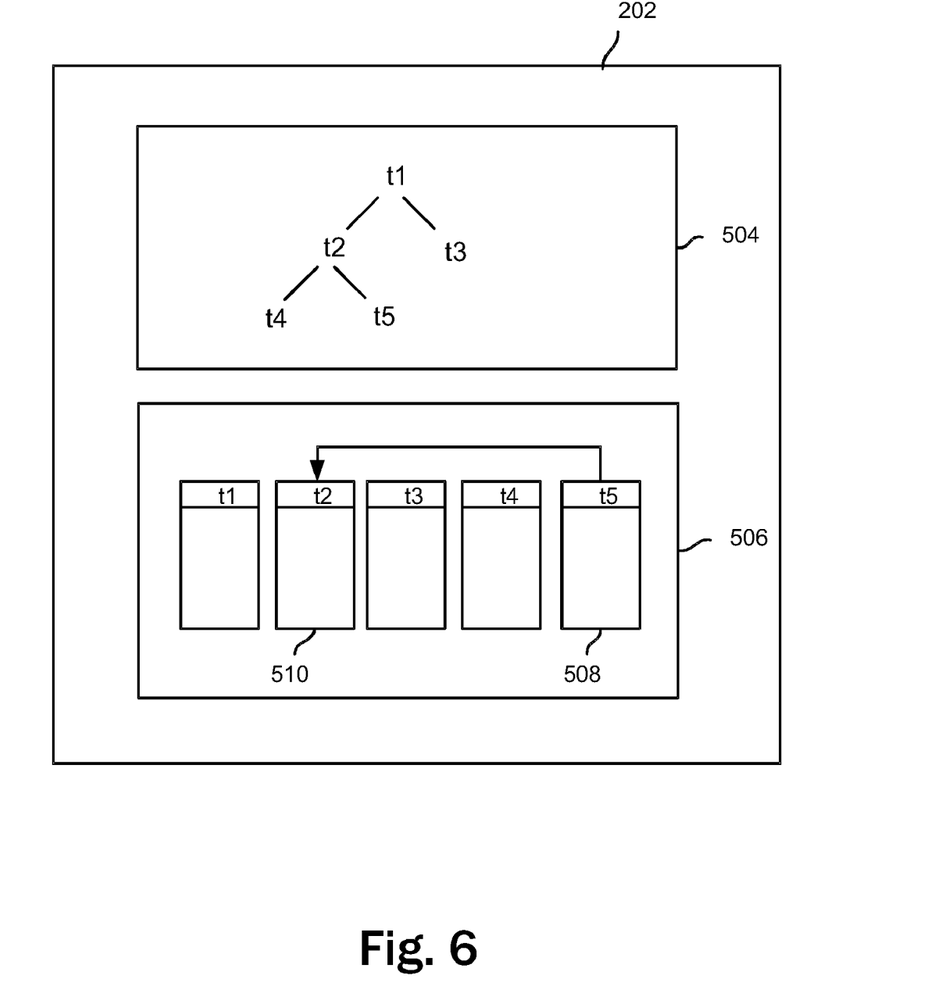
FIG. 6 shows a block diagram illustrating an embodiment of a computer system having an observation buffer associated with each running thread.

FIG. 6 is a block diagram illustrating an embodiment of a computer system 202. In the example shown, computer 202 has a plurality of threads 504 executing on it, for example by operation of one or more processors and associated memory and/or other components. In the example shown, a thread t1 has spawned child threads t2 and t3, and thread t2 has in turned spawned child threads t4 and t5. Memory 506 of computer 202 includes a set of observation buffers, one for each thread t1-t5. Each observation buffer may be configured as a fixed or variable sized region of the memory of computer 202. A first observation buffer 508 associated with thread t5 and a second observation buffer 510 associated with thread t2, which is the parent thread of thread t5 in the example shown, are included in the set of observation buffers. As illustrated by the arrow shown in FIG. 6, from the first observation buffer 508 to the second observation buffer 510, in various embodiments either the application code or the system on which it is executing is configured to pass (for example, copy) the contents from a child thread's observation buffer to the observation buffer of its parent thread (in this case t5 to t2). Using this approach, observations may be made at a plurality of sites and passed between thread and/or application binaries, enabling a more comprehensive set of observations. Each or some of the observations may include instance data from multiple perspectives to be preserved and compiled together, increasing the likelihood that a more specific and/or underlying cause of a particular error may be identified and remediated. The cause and/or remediation may be partially or fully automatically presented to or performed for the user to resolve the actual and specific problem that caused the error.

In one example that illustrates techniques described herein, a kernel memory manager decides to page out some memory. To do so, it calls into the paging code. The paging code in turn will choose memory to page out and then call into the filesystem to write to the page file. The filesystem code will then call into the disk driver to perform the actual write to a specific sector on the disk. If the disk driver fails to write to the disk, the disk driver will return some error code that means that a write to a sector failed. The filesystem may choose to pass that error message verbatim to the paging code or it could return its own error code along the lines of "write to file failed". Similarly, the paging code could either return a failure in terms of the file or disk sector affected or it could translate and put the error in terms of the process id that failed to page out. The memory manager has the same decision to make.

Thus in the course of a few function calls, the human readable error message would have changed from "Failed to write to sector x on disk y" to "Failed to page out x amount of memory for process id y". However, the remediation indicated for the former error may be different than for the latter error. Moreover, neither error message accurately captures the full scope of the problem. By comparison, the set of error codes from each semantic level of the function stack describes the problem more fully. In the preceding example, the error is not just that a write failed at some sector or that some process failed to page out memory, but that some process failed to page out memory because some write failed at some sector. Thus, it is the compilation of all the error codes that creates a full problem description and provides a complete picture of the situation. An error code from any single level of the stack just sees its small part and fails to take into account the rest of the system. Only by taking a step back and looking at the full system can a thorough understanding of the problem and proper remediation be achieved.

Figure 7:
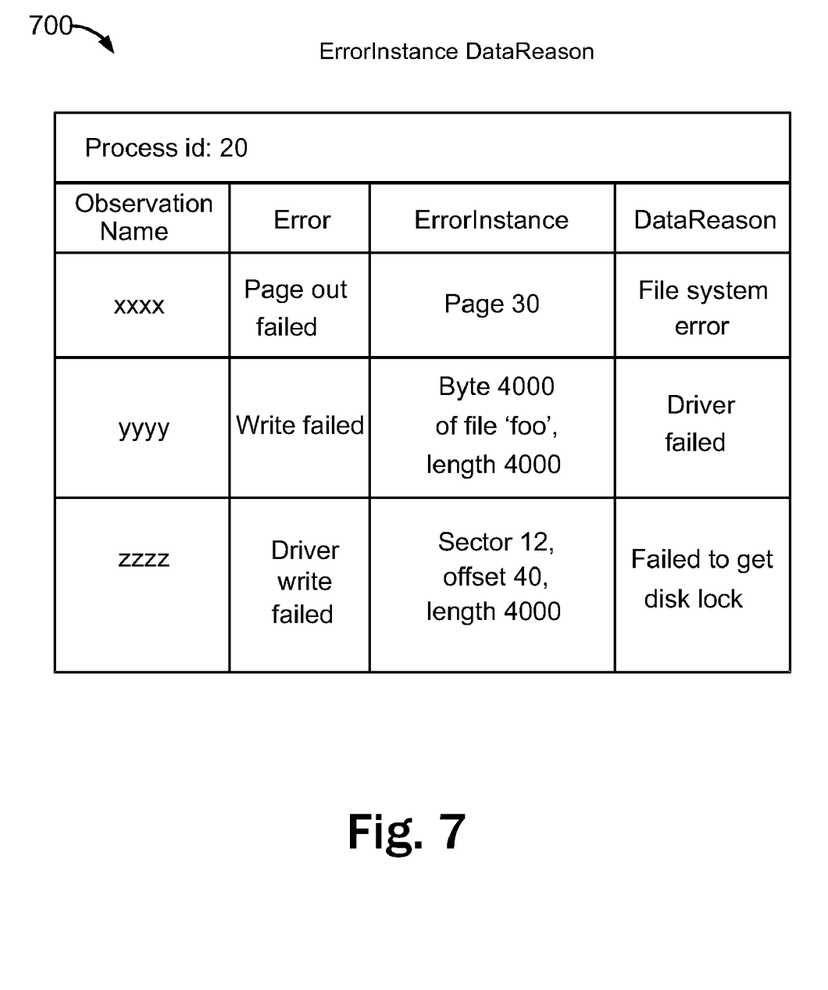
FIG. 7 shows a block diagram illustrating an embodiment of a set of observations.

FIG. 7 is a block diagram illustrating an embodiment of a set of observations, such as for the example described above. In the example shown, the set of observations 700 includes a process identifier that identifies a process with which the set of observations is associated, for example a process id of a thread with which an observation buffer in which the set of observations is stored is associated. In the example shown, each of three sites has recorded an observation. Each has given its observation a unique observation name, and each has recorded a human readable error that the observing code associates with the error, instance data observed by the code to be associated with and related to the error, and a reason determined at that site to be the cause of the error. Note that in the traditional approach the error "page out failed" and possibly the reason "due to file system error" may have been returned, whereas the set of observations 700 reveals that the underlying cause of the error was the failure of the disk driver to get disk lock for a write to a particular location on disk. The more complete and accurate picture provided by a set of observations made and processed as described herein facilitates more timely and potentially automated resolution of problems that otherwise may have required significant system down time and/or human resources to diagnose and resolve.

As noted previously, although FIG. 6 represents an embodiment having one observation buffer per thread, this is not a limitation. In alternate embodiments, an observation buffer may be implemented for each logical "task" in the system, and threads and functions may explicitly add their error observations to that task-specific buffer when working on that task. In this system, observation buffers are not explicitly associated with a thread and any one thread or function may be updating many different observation buffers.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with computer system configurations including handheld devices, microprocessor systems, microprocessor-based or programmable consumer electronics, minicomputers, mainframe computers, virtual machines, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of processing a computer error, the method comprising:
    assigning a first observation buffer to a first thread;
    executing the first thread to carry out a task, the task including a subtask;
    assigning a second observation buffer to a second thread;
    calling the second thread to carry out the subtask;
    receiving a return value indicating a failure of the second thread to carry out the subtask;
    recording an observation to the second observation buffer, the observation comprising an identifier of a possible error condition of the second thread and instance data associated with the possible error condition of the second thread, the possible error condition of the second thread being representative of a possible cause of the failure of the second thread to carry out the subtask, and wherein the instance data comprises data that was either passed to the second thread or accessed by the second thread when the possible error condition occurred;
    determining whether the task can be completed despite the failure of the second thread to carry out the subtask;
    if the task cannot be completed:
        recording, to the first observation buffer, a new observation and the observation recorded to the second observation buffer, the new observation comprising an identifier of a possible error condition of the first thread and instance data associated with the possible error condition of the first thread, the possible error condition of the first thread being representative of a possible cause of failure of the first thread to carry out the task, wherein the instance data comprises data that was either passed to the first thread or accessed by the first thread when the possible error condition of the first thread occurred; and providing the observation and new observation to a correlation engine configured to map each of the observation and the new observation to a problem statement that describes an underlying cause of the error; and if the task can be completed despite the failure of the second thread to carry out the subtask:
completing the task; and
clearing the observation from the second observation buffer.

2. A method as recited in claim 1, wherein recording the observation comprises copying contents of the second observation buffer to the first observation buffer, the copying occurring when the second thread exits.

3. A method as recited in claim 1, wherein the recording of the new observation is carried out by invoking an observation recording function.

4. A method as recited in claim 1, wherein the task can be completed despite the failure of the second thread by resolving the possible error condition encountered by the second thread, the resolving of the possible error condition comprising one of determining that the possible error condition of the second thread was expected behavior and therefore not an error condition or by completing the subtask by an alternative method, the alternative method including one of calling a second time the second thread or not calling a second time the second thread.

5. A method as recited in claim 1, wherein the recording of the observation is carried out by explicitly passing the observation across a thread or process boundary.

6. A method as recited in claim 1, wherein the recording of the observation is carried out by implicitly passing the observation across a thread or process boundary, the implicitly passing comprising invoking a procedure for passing the observation as part of thread retiring code which is executed whenever a thread exits or is closed.

7. A method as recited in claim 1, wherein:
recording the observation to the second observation buffer comprises receiving the observation as a part of a set of observations, the set of observations including a plurality of observations, each including an identifier of a possible error condition and corresponding instance data associated with the possible error condition, each observation of the set of observations being related to one another and precipitated by an initial possible error condition; and
recording of the new observation comprises adding the new observation to the set of observations received from the second observation buffer.

8. A method as recited in claim 7, wherein mapping by the correlation engine further comprises mapping the set of observations to the problem statement that describes an underlying cause of the error, the problem statement including one or more actions to recover from the error.

9. A method as recited in claim 8, wherein the problem statement includes an auto-recovery data usable to recover in an at least partly automated manner from the error.

10. A method as recited in claim 8, further comprising initiating creation of a new problem statement if the set of observations cannot be mapped to an existing problem statement.

11. A method as recited in claim 8, wherein the problem statement comprises a human readable error message that indicates one or more of the underlying cause of the error, a severity of the error, or the one or more actions to recover.

12. A non-transitory machine readable storage medium embodying computer instructions for processing a computer error, the computer instructions causing at least one processor to perform the steps of:
assigning a first observation buffer to a first thread;
executing the first thread to carry out a task, the task including a subtask;
assigning a second observation buffer to the second thread;
calling the second thread to carry out the subtask;
receiving a return value indicating a failure of the second thread to carry out the subtask;
recording an observation to the second observation buffer, the observation comprising an identifier of a possible error condition of the second thread and instance data associated with the possible error condition of the second thread, the possible error condition of the second thread being representative of a possible cause of the failure of the second thread to carry out the subtask, and wherein the instance data comprises data that was either passed to the second thread or accessed by the second thread when the possible error condition occurred;
determining whether the task can be completed despite the failure of the second thread to carry out the subtask;
if the task cannot be completed:
recording, to the first observation buffer, a new observation and the observation recorded to the second observation buffer, the new observation comprising an identifier of a possible error condition of the first thread and instance data associated with the possible error condition of the first thread, the possible error condition of the first thread being representative of a possible cause of failure of the first thread to carry out the task, wherein the instance data comprises data that was either passed to the first thread or accessed by the first thread when the possible error condition of the first thread occurred; and
providing the observation and new observation to a correlation engine configured to map each of the observation and the new observation to a problem statement that describes an underlying cause of the error; and
if the task can be completed despite the failure of the second thread to carry out the subtask:
completing the task; and
clearing the observation from the second observation buffer.

13. The machine readable storage medium of claim 12, wherein recording the observation comprises copying contents of the second observation buffer to the first observation buffer, the copying occurring when the second thread exits.

14. The machine readable storage medium of claim 12, wherein the recording of the new observation is carried out by invoking an observation recording function.

15. The machine readable storage medium of claim 12, wherein the task can be completed despite the failure of the second thread by resolving the possible error condition encountered by the second thread, the resolving of the possible error condition comprising one of determining that the possible error condition of the second thread was expected behavior and therefore not an error condition or by completing the subtask by an alternative method, the alternative method including one of calling a second time the second thread or not calling a second time the second thread.

16. The machine readable storage medium of claim 12, wherein the recording of the observation is carried out by explicitly passing the observation across a thread or process boundary.

17. The machine readable storage medium of claim 12, wherein the recording of the observation is carried out by implicitly passing the observation across a thread or process boundary, the implicitly passing comprising invoking a procedure for passing the observation as part of thread retiring code which is executed whenever a thread exits or is closed.

18. The machine readable storage medium of claim 12, wherein:
- recording the observation to the second observation buffer comprises receiving the observation as a part of a set of observations, the set of observations including a plurality of observations, each including an identifier of a possible error condition and corresponding instance data associated with the possible error condition, each observation of the set of observations being related to one another and precipitated by an initial possible error condition; and
- recording of the new observation comprises adding the new observation to the set of observations received from the second observation buffer.

19. The machine readable storage medium of claim 18, wherein mapping by the correlation engine further comprises mapping the set of observations to the problem statement that describes an underlying cause of the error, the problem statement including one or more actions to recover from the error.

20. The machine readable storage medium of claim 19, wherein the problem statement includes an auto-recovery data usable to recover in an at least partly automated manner from the error.

21. A machine readable storage medium as recited in claim 19, further comprising initiating creation of a new problem statement if the set of observations cannot be mapped to an existing problem statement.

22. A machine readable storage medium of claim 19, wherein the problem statement comprises a human readable error message that indicates one or both of the underlying cause and the one or more actions to recover.

23. A machine readable storage medium of claim 19, wherein the problem statement further comprises an indication of a severity of the error.

* * * * *